United States Patent
Roques et al.

(10) Patent No.: US 7,707,553 B2
(45) Date of Patent: Apr. 27, 2010

(54) COMPUTER METHOD AND SYSTEM FOR AUTOMATICALLY CREATING TESTS FOR CHECKING SOFTWARE

(75) Inventors: Olivier Roques, Toulouse (FR); David A. Scott, Kamuela, HI (US)

(73) Assignee: International Business Machines Corporation, Armonk, NY (US)

( * ) Notice: Subject to any disclaimer, the term of this patent is extended or adjusted under 35 U.S.C. 154(b) by 1174 days.

(21) Appl. No.: 11/299,306

(22) Filed: Dec. 8, 2005

(65) Prior Publication Data

US 2007/0240127 A1 Oct. 11, 2007

(51) Int. Cl.
*G06F 9/44* (2006.01)

(52) U.S. Cl. .............. 717/124; 717/126; 717/134; 714/34

(58) Field of Classification Search ............ 717/123, 717/126, 100, 124, 127, 125
See application file for complete search history.

(56) References Cited

U.S. PATENT DOCUMENTS

| | | | | |
|---|---|---|---|---|
| 5,708,774 A * | 1/1998 | Boden | | 714/38 |
| 5,754,755 A * | 5/1998 | Smith, Jr. | | 714/38 |
| 5,978,582 A * | 11/1999 | McDonald et al. | | 717/104 |
| 6,154,876 A * | 11/2000 | Haley et al. | | 717/133 |
| 6,633,888 B1 * | 10/2003 | Kobayashi | | 707/103 R |
| 6,754,659 B2 * | 6/2004 | Sarkar et al. | | 707/10 |
| 6,839,650 B2 * | 1/2005 | Sutton et al. | | 702/123 |
| 6,925,633 B1 * | 8/2005 | Barnett et al. | | 717/124 |
| 7,065,748 B2 * | 6/2006 | Matsuo et al. | | 717/126 |
| 7,237,231 B2 * | 6/2007 | Lambert | | 717/127 |
| 7,299,382 B2 * | 11/2007 | Jorapur | | 714/38 |
| 7,421,680 B2 * | 9/2008 | DeLine et al. | | 717/126 |
| 7,457,806 B2 * | 11/2008 | Alcorn et al. | | 707/100 |
| 2003/0037314 A1 * | 2/2003 | Apuzzo et al. | | 717/125 |
| 2004/0064806 A1 * | 4/2004 | Johnston-Watt et al. | | 717/124 |
| 2004/0143819 A1 * | 7/2004 | Cheng et al. | | 717/125 |
| 2005/0210439 A1 * | 9/2005 | Dimpsey et al. | | 717/100 |
| 2005/0268285 A1 * | 12/2005 | Bagley et al. | | 717/124 |
| 2005/0283761 A1 * | 12/2005 | Haas | | 717/124 |

(Continued)

OTHER PUBLICATIONS

DeMichiel, Linda, Sun Microsysmts, Enterprise JavaBeans Specification, Version 2.1, Nov. 12, 2003, p. 265-310, and p. 501-554.*

(Continued)

*Primary Examiner*—Wei Y Zhen
*Assistant Examiner*—Charles Swift
(74) *Attorney, Agent, or Firm*—Hamilton, Brook, Smith & Reynolds, P.C.

(57) ABSTRACT

Computer system and method automatically generates a test source code for checking validity of an application written in an object oriented language. The application includes objects accessible through an interface implementing programming rules and object behavior rules. For each object, the invention extracts object methods and attributes of the object interface which are impacted by the object behavior rules and extracts the object identification. The invention fills the variable fields of a source code template with the extracted information. The template non variable source code is in conformance with the programming rules and implements a scenario for checking a set of object behavior rules; thus the filled template forms a generated test source code. For distributed applications, the specifications may be EJB or CORBA and the Test Generator uses templates for checking the life-cycle (creation, persistency, removal) of deployed objects.

20 Claims, 10 Drawing Sheets

U.S. PATENT DOCUMENTS

| | | | | |
|---|---|---|---|---|
| 2005/0283763 | A1* | 12/2005 | Fujikawa et al. | 717/124 |
| 2007/0168973 | A1* | 7/2007 | Crihfield | 717/124 |
| 2007/0180093 | A1* | 8/2007 | Roth et al. | 709/223 |
| 2007/0240127 | A1* | 10/2007 | Roques et al. | 717/136 |

OTHER PUBLICATIONS

Kappel et al, "Modeling object behavior: To Use Methods or Rules or Both", Journal of Object-Oriented programming, 1994.*

Berner et al, "Observations and lessons learned from automated testings", ICSE'05, May 15-21, 2005, ACM Publishings.*

Bryce, "Automatica generation of high coverage usability tests", CHI 2005, Apr. 2-7, 2005, ACM Publishings.*

Li et al, "Automatic functional test program generation for Microprocessor Verification", 2005, IEEE.*

Nakajima et al, "Behavioural analysis of the EJB Component architecture", M.B. Dwyer, 2001.*

Saff et al, "Automatic test factoring for Java", ASE'05, Nov. 2005, ACM.*

Cavarra et al, "A method for the automatic generation of test suites from Object models", 2003, ACM.*

Rutherford et al, "A case for test-code generation in model driven systems", GPCE 2003.*

Sun Microsystems, Enterprise JavaBeans™ Specification, Version 2.1, Nov. 12, 2003. Table of Contents pp. 8-10; Chapter 9, pp. 123-140; Chapter 10.5, pp. 184-209.

Sun Microsystems, Enterprise JavaBeans™ Specification, Version 2.1, Nov. 12, 2003. Table of Contents; Chapters 1-4; Chapter 6; Chapter 12; pp. 439-450; pp. 459-461.

* cited by examiner

301

```
// Method used to create a Home instance from a JNDI name
private AccountHome getAccountHome()
{
properties p = System.getProperties();
    InitialContext ctx = new InitialContext(p);
    Object obj = ctx.lookup("ejb/ejbs/AccountHome");
    AccountHome oneAccountHome =
        (AccountHome) PortableRemoteObject.narrow(obj,
        AccountHome.class);
    return oneAccountHome;
}

// Method used to test the EJB object instance creation
public void testCreateAccount throws Throwable()
{
// Creation of the Home instance
AccountHome oneAccountHome = getAccountHome();

long id = getLongValue();
String owned = getStringValue();
Integer balance = getIntegerValue()
```

FIG. 5A

```
// Create Account EJB instance
Account oneAccount
    = oneAccountHome.create(id, owned, balance);
try {
// Try to find the instance we have created above
    AccountKey key = (AccountKey)
    oneAccount.getPrimarykey();
    Account theSameAccount =
    oneAccountHome.findByPrimaryKey(key);

// Check test for the field maxAllowedDeficit
        assert(oneAccount.getMaxAllowedDeficit().equals(
theSameAccount.getMaxAllowedDeficit()));

// Check test for the field Balance
assert(oneAccount.getBalance().equals(
theSameAccount.getBalance()));

// Check test for the field Id
assert(oneAccount.getId() == theSameAccount.getId());

// Check test for the field Name
assert(oneAccount.getName().equals(
theSameAccount.getName()));

// Check duplication error
try {
        // Create another Account EJB instance
        oneAccountHome.create(id, owned, balance);
        assert (false);
        }
                catch (DuplicateKeyException) {
                assert(true)
        }

} finally {
        // remove Account EJB instance
        oneAccountremove();
}
```

```
// Method used to test the EJB object instance persistence
public void testLoadStoreAccount throws Throwable()
{
// Creation of the Home instance
AccountHome oneAccountHome = getAccountHome();

UserTransaction userTransaction = getUserTransaction();

long id = getLongValue ();
String owned = getStringValue ();
Integer balance = getIntegerValue ()

// Create Account EJB instance
Account oneAccount = oneAccountHome.create(id, owned, balance);

AccountKey key = (AccountKey)
oneAccount.getPrimarykey();

Account theSameAccount = null;

try {
        // Check persistence for the field maxAllowedDeficit
        //Start a transaction
        userTransaction.begin();

// Set a value for the field maxAllowedDeficit
        Integer maxAllowedDeficit = getIntegerValue()
        oneAccount.setMaxAllowedDeficit(maxAllowedDeficit);

//Close the transaction
        userTransaction.commit();

// Try to find the instance we have created above
        theSameAccount =
        oneAccountHome.findByPrimaryKey(key);

// Check persistence for the field maxAllowedDeficit
        assert(maxAllowedDeficit.equals(
        theSameAccount.getMaxAllowedDeficit()));

// And so on for each field ...
} finally {
        // remove Account EJB instance
        oneAccount.remove();
}
```

```
// Method used to test the EJB object instance deletion
public void testRemoveAccount throws Throwable()
{
// Creation of the Home instance
AccountHome oneAccountHome = getAccountHome();

UserTransaction userTransaction = getUserTransaction();

long id = getLongValue ();
String owned = getStringValue ();
Integer balance = getIntegerValue ()

// Create Account EJB instance
Account oneAccount = oneAccountHome.create(id, owned, balance);

// Get the primary key
AccountKey key = (AccountKey)
oneAccount.getPrimarykey();

// remove Account EJB instance
        oneAccount.remove();

// Try that it's impossible to find the object
        try {
                oneAccountHome.findByPrimaryKey(key);
                assert (false);
        } catch (FinderException e) {
                assert(true);
        }

// Try that it's impossible to remove the object again
        try {
                oneAccount.remove();
                assert (false);
        } catch (RemoveException e) {
                assert(true);
        }
```

FIG. 7

COMPUTER METHOD AND SYSTEM FOR AUTOMATICALLY CREATING TESTS FOR CHECKING SOFTWARE

FIELD OF THE INVENTION

The present invention generally relates to automatic creation of tests for software; more particularly the present invention applies to creating tests for software written in an object oriented programming language such as Java or C++.

BACKGROUND OF THE INVENTION

To check a software work (e.g., program, routine, procedure, application or the like) the developers have to decide what needs to be tested and how. Traditionally, the developers generate unit tests for checking all the functions of the software. However, it is not realistic to consider that all the functions of the software will be tested with all the possible inputs. In the same way, when a software is written with an object oriented language, it is impossible to test all the methods of a class for all possible inputs. Thus, the developers try to design tests that highlight bugs in their software.

To help developers to write tests, software companies have created tools to automate the generation of tests. There are two interests in using these tools, they save time and induce reliability. However, in order to make these tests more efficient, there is a need to improve the logic behind the generation of test. The tests are automatically generated by these tools according to a logic which can be that the functions are systematically tested one after one with simple values such as 0 or null pointer as parameters. Other logics test functions in a random order or in the order they appear in the source code, or according to a source coverage, or according to a record of a previous execution of a function for a replay. So, one example is to create calls of all the methods of a class in the order they appear in the source code; calls to all the methods in a random order; calls to setter fields methods then the getters; etc. The input are taken either at random or in an set of values that are expected to be critical: null pointer, null integer value, negative or positive value, empty string, etc . . . .

In the U.S. Pat. No. 5,708,774 the tests are automatically created for detecting errors in the successive levels of calls of functions in which are given parameters. If the test is positive (e.g. no exception thrown or no bad assertion risen), the result of a first test is used to create the next test: these tests are not relevant because the scenario does not respect the business logic of the application. If a test is done on accordance with the semantic of the application, an execution error, for instance could be a good behavior for a test.

Ideally, to be more efficient, test generation should follow a scenario adapted to the business logic of the application operating that software. The difficulty to generate relevant tests is that the nature of the test is closely related to the semantic of the application under test. Unfortunately, it is quite impossible to create test generators which can adapt to the semantic of the application. The test tools cannot discover this semantic and the generated tests are far from the test that would be performed by the programmer who has the knowledge of the semantic of the application under test. For example, in an application managing bank accounts, a class Account is written with methods deposit( . . . ), withDraw( . . . ), getBalance( ) and getMaxDeficitAllowed( ), it would be particularly relevant to check that one cannot withdraw an amount X if X is greater than getBalance( ) unless this amount is less than getMaxDeficitAllowed( )+getBalance( ).

However to improve test efficiency, there is a need for a method to create test generators which can be used to test an application independently from its particular semantic but with a test scenario which is close to the logic of the programming of the application.

SUMMARY OF THE INVENTION

It is therefore an objective of the present invention to provide a method which creates a test generator testing a software written in an object oriented language according to the logic of the programming of the application.

These objectives are achieved, as claimed in claims 1 to 13 with a method and a computer program for automatically generating a test source code for checking validity of an application written in an object oriented language comprising objects accessible through an interface implementing programming rules and object behavior rules, said method comprising for each object of the application extracting the object methods and attributes of the object interface which are impacted by the object behavior rules and extracting the object identification; filling the variable fields of a template of source code with the extracted information, said template non variable source code being in conformance with the programming rules and implementing a scenario for checking a set of object behavior rules, said filled template being the generated test source code. When the application to be tested is a distributed application the specifications may be EJB or CORBA and the Test Generator can use templates for checking the life-cycle (creation, persistency, removal) of the deployed objects.

The solution of the preferred embodiment relies on the programming standardization of 'behavior' of objects such as the life cycle rules of objects for application in a distributed environment. Checking of the object behavior rules can be used as a basis for test scenario.

For instance, Java 2 Platform, Enterprise Edition (J2EE) refers to standards for developing and deploying enterprise applications, Enterprise Java Beans (EJB) or Common Object Request Broker Architecture (CORBA) defining component models in which the business logic is encapsulated into business objects. In the EJB specifications, Chapter 12. (Entity Bean Component Contract for Bean-managed Persistence) contains programming rules describing the persistence of objects. The tests generated by the method of the preferred embodiment check that the behavior of the deployed objects of the enterprise application is in conformance with the recommendation of Chapter 12 (Entity Bean Component Contract For Bean Managed Persistence) of the EJB specifications 2.1. The scenario of the tests generated comprises checking a minimum of steps in the life-cycle implementation of deployed objects of the application to be tested. This has the advantage of testing the essential part of the logic of the application.

Furthermore, these tests can be created with the use of a template because the tests use the exported API of the software to be tested and the naming rules are described in the specifications that the software has implemented. Consequently, the tests can be automatically generated and are particularly reliable (programming errors free). However, the generator can be written in any language even not in object oriented language.

One other advantage is that the tests automatically generated which are compliant with the specifications by the test generator of the invention will check that the deployed object lifecycle implementation is also compliant with the specification.

In the programming community, the use of the invention has a beneficial impact for the education of the programmers as the generated tests follow the programming specifications and will highlight common best practices in object deployment testing to programmers not familiar with object deployment implementation specifications.

One very significant advantage is the fact that the test generator of the preferred embodiment creates tests for checking a minimum of steps in the lifecycle implementation of each deployed object which could be combined by the programmers knowing the semantic of the application to create more complete test scenarios corresponding to more concrete use cases. The tester can assemble the tests created by the generator to create new tests more detailed and closer to the business logic of the application.

BRIEF DESCRIPTION OF THE DRAWINGS

The foregoing and other objectives, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 5A and 5B illustrate an example of source code of the test for checking the creation of an object generated according to the preferred embodiment;

FIG. 6 illustrates an example of source code of the test for checking persistence of the persistence of an object generated according to the preferred embodiment;

FIG. 7 illustrates an example of source code of the test for checking the removal of an object generated according to the preferred embodiment.

DETAILED DESCRIPTION OF THE INVENTION

Figure 1:
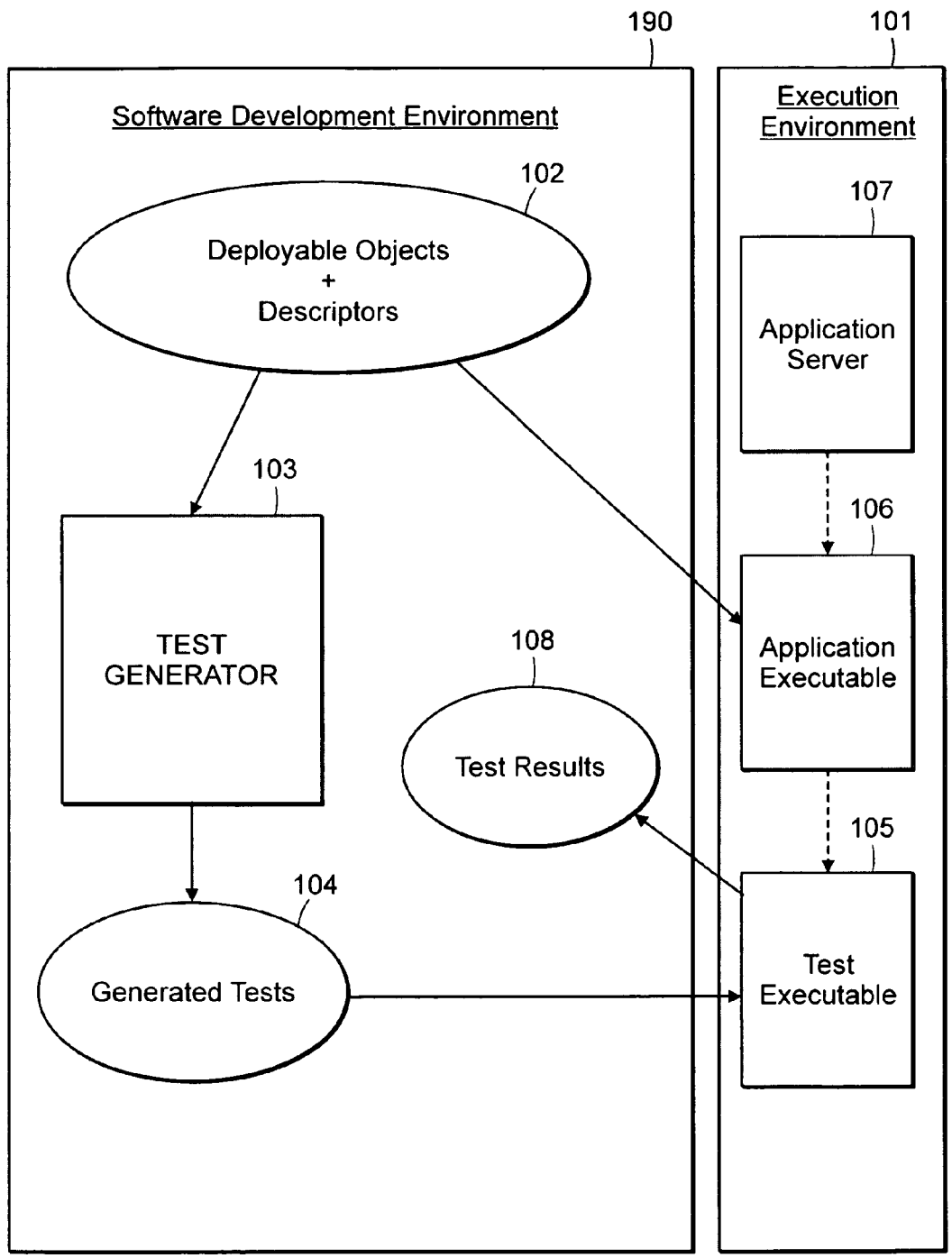
FIG. 1 illustrates the environment for testing an application with tests generated according to the preferred embodiment.

FIG. 1 illustrates the testing environment for testing a software application with tests generated according to the preferred embodiment. The test generator is created in the "Software Development Environment" (190). The tests are also generated in the "Software Development Environment" (190) and are then executed in the "Execution Environment" (101).

Not represented on FIG. 1, the Software Development Environment (190) which may operate on a computer independent from the execution computer, comprises a development framework which is a set of tools, as editors, compilers, linkers available in its workspace to build the application. Also, part of the Software Development Environment (190), syntactic and semantic programming rules are described in specifications such as EJB or CORBA well known for developing business applications written in an object-oriented language.

The developer creates an Application Executable (106) to be tested. To create the Application Executable, the developer defines in the Software Development Environment (190) the object model with classes describing objects and methods (idl files for CORBA, java files and descriptor files for EJB) and all the application artifacts (102) following development specifications. The classes are then compiled and linked to form the Application Executable (106).

In the preferred embodiment, the application to be tested is a distributed application deployed in two parts which are the client side component and the server side component. The deployed application comprises two executables one on the server side and one for the client side. The distributed applications are implemented on servers and are accessed by client applications which reach the objects of the server application through their API. Usually, the server application is executed on one server or more and each user accesses the server application through a client application executed on his workstation. The Software Development Environment (190) comprises a development framework including generators and runtimes which allows developers to generate several pieces of code which provide the communication between the server part and the client part where the deployed objects are used. The framework is used by the developer to manage the deployed application and to produce a client proxy. The client proxy is a component allowing a client application to call the server application through a simple Application Programming Interface (API). All low level communications are hidden to the developer who then concentrates his efforts on the business aspects of the application.

The tester uses the same Software Development Environment for creating a Test Generator (103) as described later in reference to FIG. 2. The Test Generator (103) is developed in any type of language.

To perform the tests testing the code of the Application Executable (106), the tester first invokes the Test Generator (103) which produces the Generated Tests (104); then, still using the development framework of the Software Development Environment (190), the tester creates the Test Executable (105) as a client application for the Generated tests (104). The development framework helps the tester to create source code files, deployment files and build files necessary to create a Client Application. As with many client applications, the Test Executable (105) is able to interface with the Application Executable (106) (call for Test Executable to Application Executable is represented in FIG. 1 with a dotted line) and can be run in parallel of the Application Executable (106), through the same server or not. The Application Executable (106) must be run through one or many "Application Server" (107, call for Application Executable to Application Server is represented with a dotted line) on one or many machines located in a network. The tester executes the client application for testing the server application in the Execution Environment (101). The Test Results (108) are sent to the Software Development Environment and used by the tester to perfect the Application Executable code. The test environment with the client application based on the Generated Tests (104) and the server application based on the Application executable (106) is described later in reference to FIG. 3.

Figure 2:
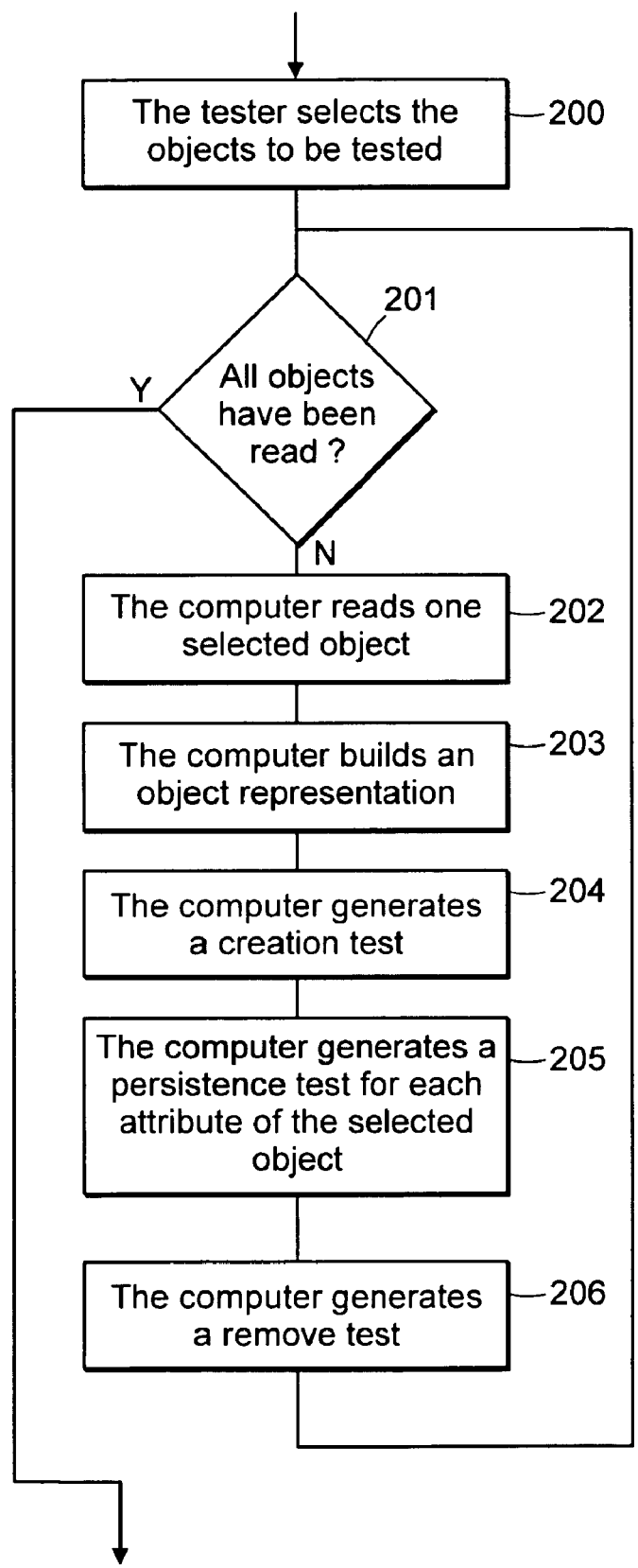
FIG. 2 is the general flowchart of a method of generating tests according to the preferred embodiment.

FIG. 2 is the general flowchart of a method for generating tests according to the preferred embodiment. The specifications such as EJB or CORBA implemented by the developer to develop deployed applications, make possible the automatic generation of tests. Firstly, the syntactic programming rules described in the specifications allows the invention system to create a template of source code of tests for automatic generation of code. Secondly, the contract described in the specifications imposes a semantic logic in the life-cycle of the deployed objects. For instance, at the minimum, each object is created once and only once, the created objects can be retrieved and the deleted objects can no longer be retrieved. Consequently, the Test Generator (103) of the preferred embodiment generates tests having a scenario that checks the life-cycle of the objects of the application.

First the tester must select (200) the deployed objects of the application for which he wants to generate a test. For each selected object (201), the test generator (103) reads (202) all the artifacts describing this object as the java or C++ source code files and possibly descriptors as CORBA IDL files or EJB deployment files, the Deployable Object Classes and Descriptors (102):

- source code files written in Java, C++ or in other programming language,
- deployment descriptor files which describe how the distributed application must be deployed,
- possible specification file which are used to generate source code of deployed object as "idl" file in a CORBA environment
- other "makefile", "build", binary files necessary to create the application The tester creates the Test Generator (103) in any programming language. The first step of the Test Generator (103) is to create (203) an internal representation (table, tree etc.) of the selected objects with a pertinent and minimum set of information extracted from the Deployable Object Classes and Descriptors (102). The internal representation of an object comprises:

- The pathname of the object (name+package hierarchy)
- The type of the primary key
- The method used to get the primary key
- The find method corresponding to the key type
- The constructor method
- The destructor method
- For each attribute of the object
- The name
- The type of the attribute
- The get method of the attribute
- The set method of the attribute
- Eventually an external reference of the object After step 203, an optional step of checking, not illustrated in FIG. 2 could be provided by the Test Generator (103) to be sure that all these information are valid then, the test generation is performed.

The Test Generator (103) reads in each object representation the information relevant to be inserted in a test source code template written in the object oriented language of the test to be generated. One test source code template is prepared for each test.

Each template follows a scenario which is in accordance with the programming logic described in the programming specifications. Furthermore, in the preferred embodiment a basic set of test templates is provided in the Test Generator corresponding to a set of tests covering the object life-cycle as recommended in the specifications: the creation of objects, the persistence of objects and the deletion of objects.

The first test is the creation of a deployed object (204). Included is creation of an instance, checking that this instance can be reached by its primary key, and checking that a second instance of the same object is impossible.

The following test corresponds to each attribute persistence (save/load) (205). It comprises doing a creation of an instance, and for each attribute of the object, to set a value for this attribute, to commit the instance, to reach the instance by its primary key, and to check that the corresponding attribute has been set to the correct previous value.

The third test is for the deletion of the object (206). It includes doing a creation of an instance, immediately after doing the destruction of this instance, and then check that this instance can't be reached by its primary key, and check that this instance can't be removed twice.

An example template for each of these tests is provided later in reference to the description of FIG. 4. The Test Generator (103) uses the template by inserting in each of the test templates prepared by the tester, the information read in the object structure in order to obtain the corresponding test source code. Once all the test source codes are generated for each deployed objects selected by the tester (answer Yes to test 201), the test generation is completed. The tester compiles and links the test source codes, creates the deployment environment of the test as a client application and executes the tests in the Execution Environment (101) which generates reports.

It is noted that once the code of the application is tested as for the life-cycle of its deployed objects, the tester can efficiently create new tests more in relation with the business logic of the application on a clean code basis. It is also noted that the Generated Tests source code (104) based on the standardized life-cycle of the objects can be reused, combined and repeated for testing other object behavior such as the robustness of the objects (is not part of the standardized life-cycle of the objects) by repeating the creation tests of FIG. 2.

Figure 3:
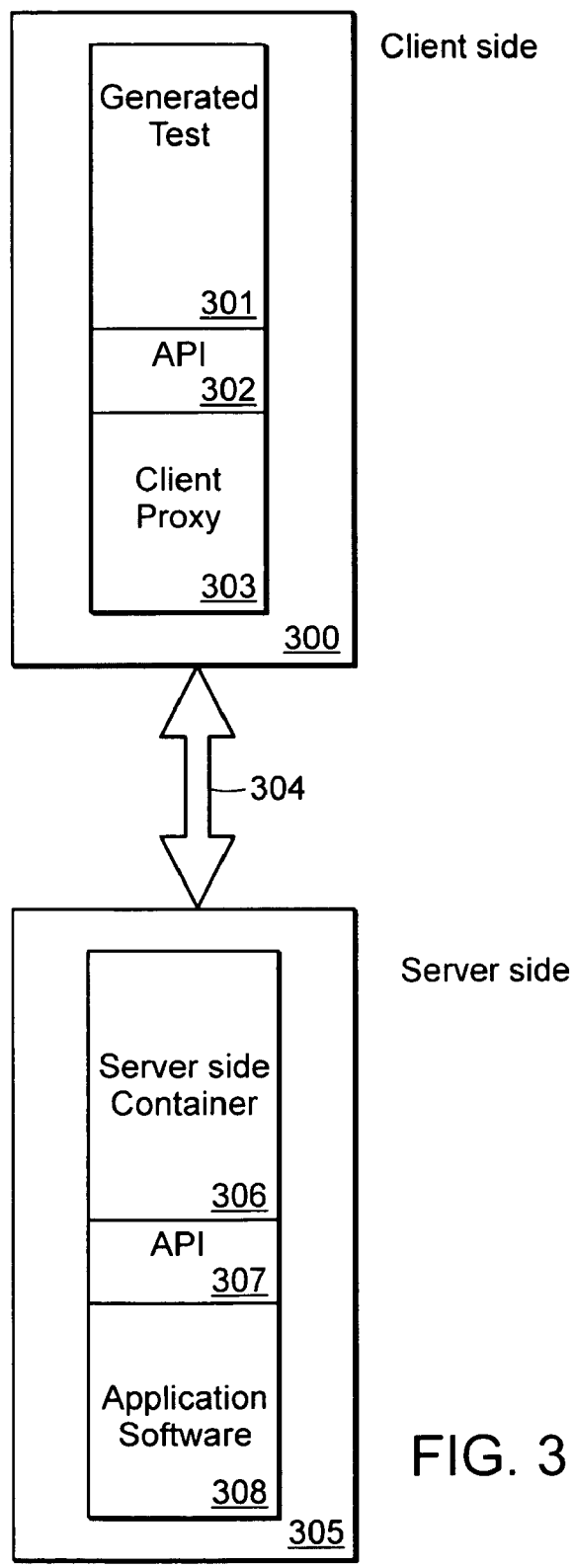
FIG. 3 illustrates the architecture used in the testing environment of the tests generated with the generator of the preferred embodiment.

FIG. 3 illustrates the architecture used in the testing environment of the tests (104) generated with the generator 103 of the preferred embodiment. It shows that the tests automatically generated with the method of the preferred embodiment are tested as a client application which accesses the server application (308) by calling the objects to be tested through their natural API (302, 307). The client application of the tests is thus developed in respect with the same specifications for deployed applications such as EJB or CORBA used for the development of the application to be tested. The same development framework provided with the specifications is used by the tester.

The client side application (300) comprises the Generated Test source code (301; 104 of FIG. 1) with an API (302) for access to its objects, the Client Proxy (303) being used to interface the Server Side (305).

The Server Side (305) comprises the Server Side Container (306) which is generally a part of the Application Server (107) of FIG. 1. According to an API (307), this part of the Application Server (107, 305) calls the objects of the Application Software (308) for which the executable is the Application Executable (106) of FIG. 1 to be tested. The standardized Application Programming Interfaces API's (302, 307) are also described in the published specifications such as EJB or CORBA as well as the naming rules.

- On the Client Side (300) the test (301) calls the application proxy (303) through the standardized API(302).
- On the Server Side (305) the Deployed Application (308), which is developed in accordance with the standardized API (307), is awaken by the Server side layer (306).
- Communications (304) between the two sides (300, 305) are performed by the technology of the tools provided in the development framework.

Figure 4:
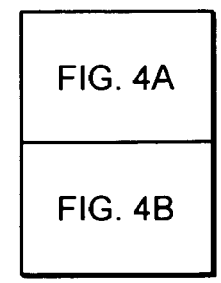
FIG. 4 illustrates an example of class diagram for one deployed object of the application to be tested for which a test is automatically generated according to the preferred embodiment.
Figure 4A:
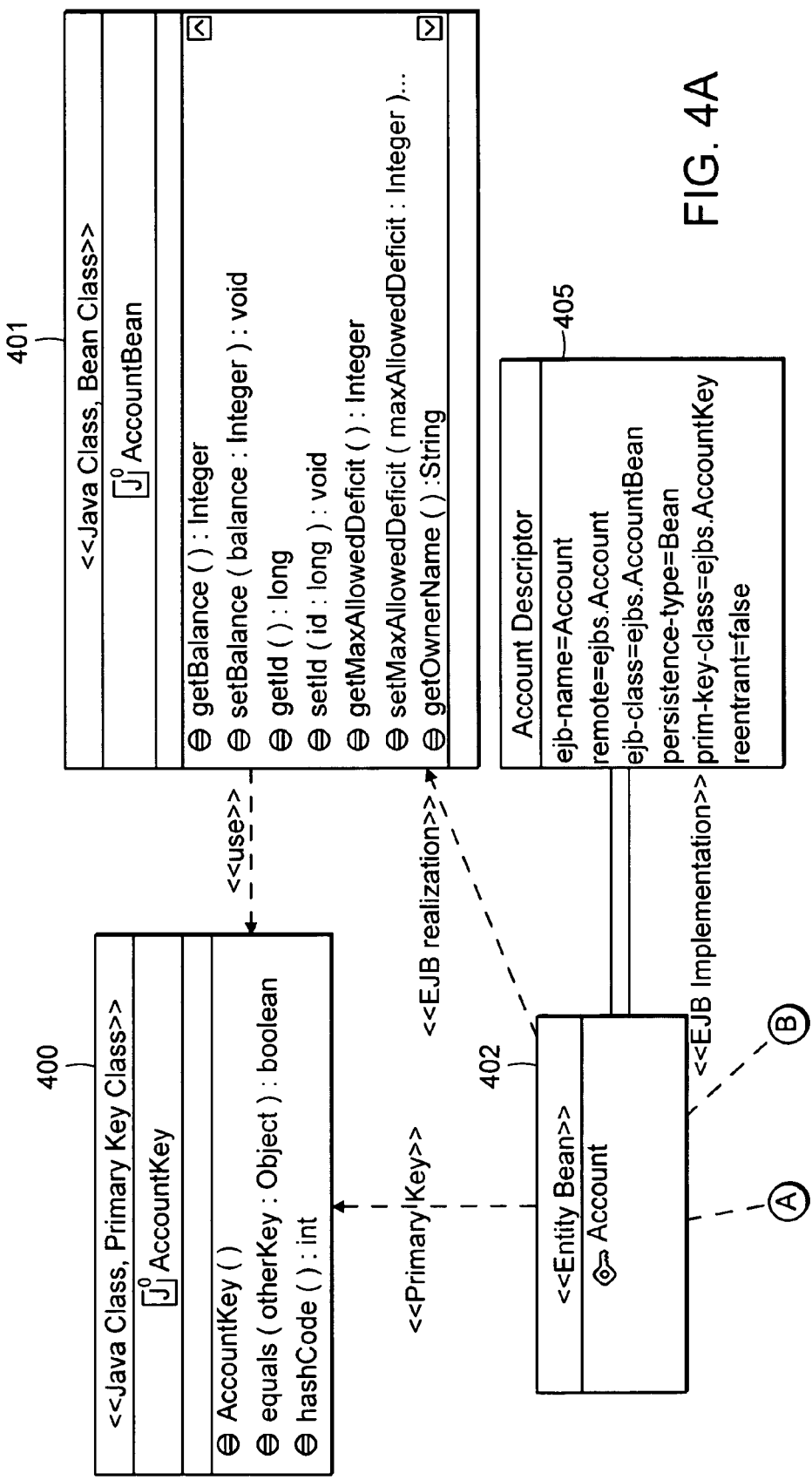
Figure 4B:
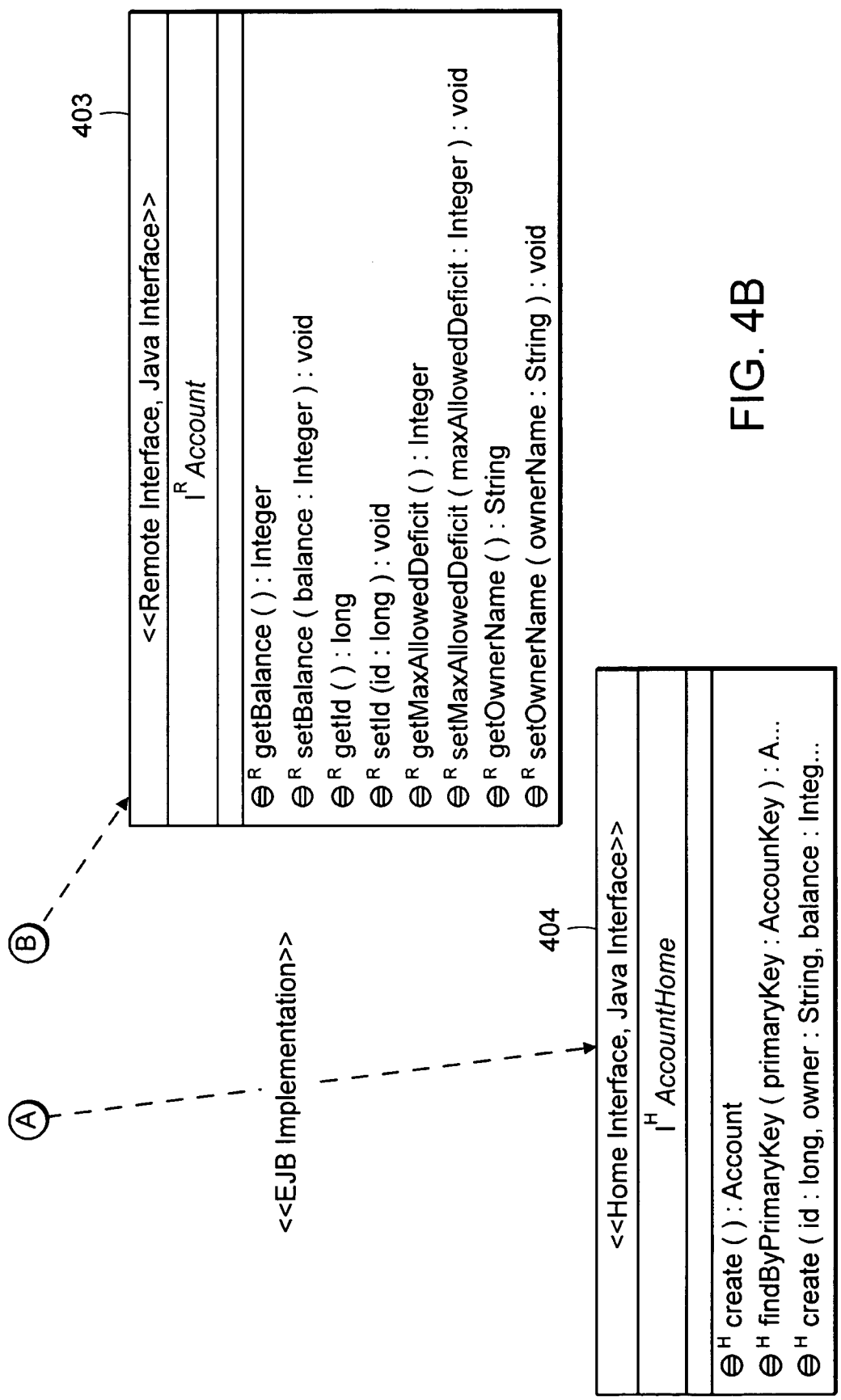

FIG. 4 illustrates an example of class diagram for one deployed object of the application to be tested for which a test is automatically generated according to the preferred embodiment. FIG. 4 gives a diagram representation of the "Account" object 402 which is an example of EJB object of a banking distributed application for which we want to generate a test according to the preferred embodiment. The application and the test are implemented in Java language.

As any Enterprise Java Bean the Account object (402) is made of a set of Java classes 400, 401:
- the "bean" (401) which contains the implementation;
- the "home" (remote or local) interfaces (404); objects noted $o^H$ in FIG. 4 are created through the Home interface.
- and the (remote or local) business interfaces (403) that are called by the client; a remote interface on a remote server in FIG. 4 is noted $o^R$ and a local interface used locally on the same server is noted $o^L$ The Account object (402) is also made of a deployment descriptor (405): "ejb-jar.xml".

By analyzing these java classes (at 203, FIG. 2), it is possible to extract pertinent data forming the object representation:

The name of the object
Account is the name of the EJB
The signature of the methods used to create the object
create( )
create(long, String, long)
The signature of the method used to remove the object
Void remove( )
The type of the key used to find the object
AccountKey
The signature of the method used to find the object 402
Account findByPrimaryKey(AcountKey)
The object getter and setter methods
long getId
void setId(long)
Integer getMaxAllowedDeficit( )
Integer setMaxAllowedDeficit(Integer)
Integer getBalance
Integer setBalance (Integer)
String getOwnerName( )
void setOwnerName(String)
void setOwnerName(String)

The JNDI name (external name of the object) that the EJB is bound to is also extracted from the descriptor file (102). One can take as example, the test automatically generated on a EJB BMP named Account whose home interface is bound to the JNDI name "ejb/ejbs/AccountHome".

Hereafter is provided a sample of source code templates created according to the preferred embodiment and used by the Test Generator 103 for creating test source codes 105, 301. The sample of templates correspond to three tests for which the scenario is in line with the deployed object lifecycle EJB 2.1 Chapter 12 specifications. The three tests form in the preferred embodiment a set of tests which are also in conformance with the programming rules of the same specifications.

The following figures (FIGS. 5, 6 and 7) provide samples of source code of tests generated according to the preferred embodiment for checking the behavior of deployed objects of a distributed application. In FIGS. 5, 6 and 7, the template fixed words used by the Test Generator (103) embedded in the source code are underlined. The variable fields filled by the Test Generator 103 in the template are written in Italic in FIGS. 5, 6 and 7. Some comments which can also be generated automatically by the Test Generator 103 are indicated in generic font in FIGS. 5, 6 and 7.

The code of the Test Generator (103) is written in any type of language but the language for the test source codes (301, 104) is an object-oriented language, preferably the object-oriented language used for the development of the application to be tested. This is the case if the tester, as suggested in the preferred embodiment, uses the same Software Development Environment than the developer of the application to be tested. The source code examples provided in the following figures are written for testing an EJB (object) written in Java language. The test framework used may be the well known Junit test framework but any other environment may be considered. More generally, the generated code (301, 104) and the Test Generator (103) depends on the chosen test framework. Last point, the examples provided hereafter are tests created for checking the behavior of the same sample object (Account) 402 provided in FIG. 4. To summarize the convention in the source code illustrated in the following figures:

The generic code is underlined in the figures: it is a variable template of the test code created by the generator (103) in the preferred embodiment.

The variable code depending on the object information is in italic: this variable information is read by the Test Generator from the object representation previously built.

FIGS. 5A and 5B illustrate an example of source code (301) of the test (104) for checking the creation of an object generated according to the preferred embodiment. This test source code (301) is created by the Test Generator (103), when executing step 204 in FIG. 2, using a source code template corresponding to a scenario for checking the creation of an object in conformance with the EJB deployed application development specifications.

In the source code (301), the Test Generator (103) automatically generates a method named "getAccountHome" used to produce a "Home" intermediate object. This intermediate object, created with the "JNDI" name, is used to create "remote" or "local" instances of tested EJB object. In the example "remote" instances are created, the method would have been slightly different for "local" instances.

Then, the test generator (103) generates a method, named "testCreateAccount", to test the creation of the EJB. The goal is mainly to test the callbacks methods called by the EJB container and implemented by the programmer: ejbCreate( . . . ), ejbFindByPrimaryKey( . . . ).

The scenario of the object creation test in the preferred embodiment comprises the following tasks:
Create an Account;
Try to find it with its primary key;
Check that we get the same Account by checking it's persisted fields;
Try to create another account with the same value.
Check that a duplicate error (in java a "DuplicateKeyException") is thrown;
Remove the Account to let the testing environment database unchanged.

The corresponding code for generating the creation test is illustrated by the source code (301) of FIGS. 5A and 5B.

It is noted that the inputs of the methods called by the generated tests (104, 301) (such as id, owned and balance of the method create), are generated automatically with a default or a random value which can be changed with the help of a user interface by the tester.

FIG. 6 illustrates an example of source code (301) of the test for checking of the persistence of an object generated according to the preferred embodiment. This test source code is created by the Test Generator (103), when executing step 205 in FIG. 2, using a source code (301) template corresponding to a scenario for checking the persistence of an object in conformance with the EJB deployed application development specifications.

In order to test that the fields of the EJB are well stored in the underlying database of the testing environment and well loaded from the database into the memory (by the callbacks ejbCreate( ), ejbLoad( ) and ejbStore( ) that the developer has to write and that are indirectly called by the EJB container), the test generator (103) generates a method, named "testLoadStoreAccount".

The principle is to modify a field of the EJB and to perform a commit, in order to make the underlying persistent support (in general a database) updated. Then one reads the value of the field, expecting that it will be the same than the value set previously. To ensure that ejbStore( . . . ) and ejbLoad ( . . . ) are called one might configure the application server (107) so that it doesn't use some cache mechanisms. If it is not possible, one can stop and restart the application server (107) (time is not really a constraint at the test running step).

The scenario of the test of the object persistence, according to the preferred embodiment, comprises the following tasks:
Create an Account;
For all attribute of the EJB:
Start a transaction,
Set a value for the attribute,
Commit the transaction,
Try to find the object with its primary key,
Check that we get the same value;
Remove the Account to let the testing environment.

The corresponding code for generating the persistence test is illustrated by the source code (301) of FIG. 6.

As in the previous test, the method "getAccountHome" is used.

FIG. 7 illustrates an example of source code (301) of the test for checking the removal of an object generated according to the preferred embodiment. This test source code is created by the Test Generator (103), when executing step 206 in FIG. 2, using a source code template corresponding to a scenario for checking the removal of an object in conformance with the EJB deployed application development specifications.

In order to test the removal of an object, the Test Generator 103 generates a method, named "testRemoveAccount".

The scenario for testing the removal of an object, according to the preferred embodiment, comprises the following tasks:
Create an Account;
Get the corresponding primary key
Remove the object
Try to find the object with its primary key,
An error must occur: for example a java "FinderException"
Try again to remove the object
An error must occur: for example a java "RemoveException".

The corresponding code for generating the remove test is illustrated by the source code (301) of FIG. 7.

As in the previous test, the method "getAccountHome" is used.

The three test scenario samples described above are particularly powerful for the test of "Entity Bean" which are "Bean Managed Persistence" (BMP) and for CORBA application.

For this type of object it is recommended to create a Test Generator (103) according to the preferred embodiment for generation of tests checking adequacy of the life-cycle of the BMP objects of the subject application (creation, deletion, persistence of the objects in a data base) with the recommendations of the EJB specifications.

CORBA is a specification used by a lot of market tools to provide facilities to build distributed application. Generally, communication libraries are delivered with a code generator. From an abstract interface definition file, written in the IDL standardized language (Interface Definition Language) the generator produces:
a set of interfaces in C++ or Java programming language associated to a set of client proxy used by a client part
a set of skeletons in C++ or java programming language corresponding to the server part which must be implemented by the final user.

All the naming rules are defined in the CORBA specification (in particular Chapter 7, Dynamic Invocation Interface) and could be implemented by the tool in C++ or Java.

The first point is that according to the sub-chapter 4.4 of the EJB specifications, the invocation of EJB must be possible through CORBA, i.e. the generated C++ or Java interface. Consequently other embodiments of the present invention adapt the test generator (103) and the templates to be able to generate, from the IDL definition, a test using these naming rules to invoke the CORBA client interfaces.

The second point is that even when the server side (305) is not implemented according EJB specification, it's always possible to test the life cycle of server side object implementation using the same techniques. In this case the test is essential, because, as for Bean Managed EJB, the implementation is provided by the user.

In the case where the "Entity Bean" are "Container Managed Persistence" (CMP), the life-cycle is managed by the runtime of the chosen technology. This test could be useful to prove that the technology is safe and correctly used in the actual application environment.

More generally, as a skilled person can understand, a same kind of creation or remove tests may be generated for "Session Bean" and if the subject objects contain attributes with getters and setters (usual naming conventions), with some adaptation in the test template, similar persistence tests can be created as well.

Once the tests have passed, the tester can focus on testing the business logic of the application, being confident that potential bugs that could arise are not due to the use of the distributed object technology.

Figure 8:
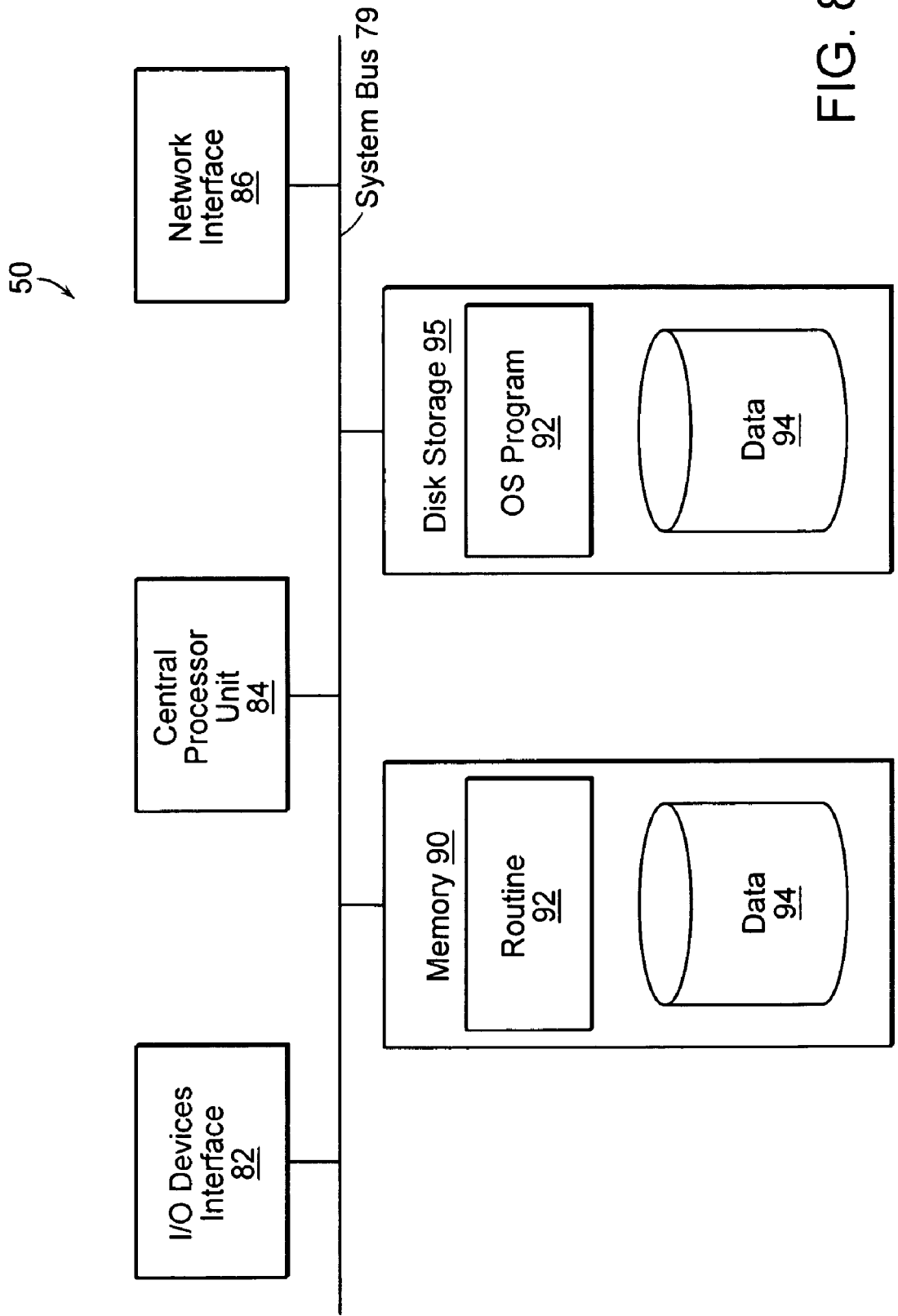
FIG. 8 is a block diagram of a computer or digital processing environment in which embodiments of the present invention are operated.

Turning to FIG. 8, the invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-readable medium may comprise both computer-readable storage medium and communication medium. Communication medium can be an optical, electromagnetic, infrared, or a propagation medium. Computer-readable storage medium can be electronic, magnetic or semiconductor system (or apparatus or device). Examples of a computer-readable storage medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system (50) suitable for storing and/or executing program code (92) and supporting data (94) will include at least one processor (84) coupled directly or indirectly to memory elements through a system bus (79). The memory elements can include local memory (90) employed during actual execution of the program code (92), bulk storage (95), and cache memories which provide temporary storage of at least some program code (92, 94) in order to reduce the number of times code must be retrieved from bulk storage during execution.

Input/output or I/O devices (including but not limited to keyboards, displays, pointing devices, etc.) can be coupled to the system (50) either directly or through intervening I/O controllers and interfaces (82).

Network adapters and interfaces (86) may also be coupled to the system to enable the data processing system (50) to become coupled to other data processing systems or remote printers or storage devices through intervening private or public networks. Modems, cable modem and Ethernet cards are just a few of the currently available types of network adapters (86).

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of automatic testing a subject application written in an object oriented language, the subject application having objects accessible through an interface implementing programming rules and object behavior rules, said method comprising the steps of:
   a—selecting one of the objects of the subject application and reading information defining the one object;
   b—using computer automation, extracting information from the selected object, the extracted information including a definition, object methods and attributes of the object interface which are impacted by the object behavior rules and object identification;
   c—using computer automation, providing a template of source code, the template having variable fields and fixed portions of source code; and
   d—using computer automation, filling the variable fields of the template with the extracted information, said template fixed portions of source code being in conformance with the programming rules and implementing a scenario for checking a set of object behavior rules, said filling resulting in an automatically generated test source code and in an automatic testing of the subject application by the generated test source code checking logic validity of the subject application independently of testing semantics.

2. The method of claim 1 wherein
   the step of extracting information from the selected object includes extracting from interfaces and descriptors defining the object: a creation method, a find method, a remove method, a setter method, a getter method, the object name and object external name; and,
   the step of filling the variable fields includes use of the template fixed portions of source code being in conformance with the programming rules for development of a distributed application and implementing a scenario for checking a set of object behavior rules of a distributed application.

3. The method of claim 2 wherein the step of filling the variable fields includes using the template fixed portions of source code implementing a scenario for checking object life-cycle rules.

4. The method of claim 2 wherein the step of filling the variable fields includes using the template fixed portions of source code implementing a scenario for checking object life-cycle rules of EJB or CORBA specifications.

5. The method of claim 4 wherein the step of filling the variable fields includes using the template fixed portions of source code which implements a scenario for checking creation of the selected object.

6. The method of claim 5 further comprising the computer implemented steps of:
   creating a deployable object representing the selected object;
   finding an object with a same key as the created deployable object;
   checking that the found object is the same as the created deployable object by checking that both objects have the same persisted fields;
   trying to create another object with the same key;
   checking that an error or an exception is raised in response to trying to create said another object; and
   removing the created deployable object.

7. The method of claim 4 wherein the step of filling the variable fields includes using the template fixed portions of source code which implements a scenario for checking persistency of the selected object.

8. The method of claim 7 further comprising computer implemented steps of:
   creating a new deployable object representing the selected object;
   for each object field of the created object:
      starting a transaction;
      setting the field to a random value;
      committing the transaction;
      trying to find an object with a same given key as the created object;
      getting from the found object a field value;
      checking that the field value of the found object is the same as the field value set for the created object; and
      removing the created object.

9. The method of claim 4 wherein the step of filling the variable fields includes using the template fixed portions of source code which implements a scenario for checking removal of the selected object.

10. The method of claim 9 comprising the computer implemented steps of:
   creating a new deployable object representing the selected object;
   removing the created object;
   trying to find an object with a same key as the created object;
   checking that an error or an exception is raised;
   trying to remove the created object twice; and
   checking that an error or an exception is raised.

11. The method of claim 4 wherein the step of filling the variable fields includes using the template fixed portions of source code which implements a scenario for checking robustness of the selected object.

12. The method of claim 2 further comprising the computer implemented steps of:
- developing a client application;
- compiling and linking the client application and the generated tests;
- executing the tests as a client application interfacing a server side of the distributed application; and
- collecting test results.

13. A computer program product for automatic testing of a subject application, the computer program product comprising a computer usable storage medium having a computer readable program wherein the computer readable program when executed on a computer causes the computer to:
- (a) select one object of the subject application and read information defining the object, wherein the subject application is written in an object oriented language and has objects accessible through an interface implementing programming rules and object behavior rules;
- (b) extract information from the selected object, the extracted information including a definition, object methods and attributes of the object interface which are impacted by the object behavior rules and object identification;
- (c) fill fields of a template with the extracted information, the template being a template of source code and the template having variable fields and fixed portions of source code, said template fixed portions of source code being in conformance with the programming rules and implementing a scenario for checking a set of object behavior rules, said filled template resulting in an automatically generated test source code and in an automatic testing of the subject application by the generated test source code checking logic validity of the subject application independently of testing semantics.

14. A computer program product as claimed in claim 13 wherein the computer
- extracts information from the selected object including extracting from interfaces and descriptors defining the object a creation method, a find method, a remove method, a setter method, a getter method, the object name and object external name; and,
- fills fields including using template fixed portions of source code being in conformance with the programming rules for development of a distributed application and implementing a scenario for checking a set of object behavior rules of a distributed application.

15. A computer program product as claimed in claim 13 wherein the template implements any combination of:
- a scenario for checking object life-cycle rules,
- a scenario for checking the life-cycle rules of EJB or CORBA specifications;
- a scenario for checking creation of the selected object,
- a scenario for checking persistency of the selected object,
- a scenario for checking removal of the selected object, and
- a scenario for checking robustness of the selected object.

16. A computer program product as claimed in claim 14 wherein the computer readable program when executed further causes the computer to:
- develop a client application;
- compile and link the client application and the generated tests;
- execute the tests as a client application interfacing a server side of the distributed application; and
- collect test results.

17. Computer apparatus for automatic testing of a subject application comprising:
- means for selecting an object of the subject application and reading information defining the object, wherein the subject application is written in an object oriented language and has objects accessible through an interface implementing programming rules and object behavior rules;
- means for automatically extracting information from the selected object including extracting a definition, object methods and attributes of the object interface which are impacted by the object behavior rules and object identification; and
- means for automatically filling fields of a template of source code with the extracted information, said template having fixed portions of source code being in conformance with the programming rules and implementing a scenario for checking a set of object behavior rules, said filled template resulting in an automatically generated test source code and in an automatic testing of the subject application by the generated test source code checking logic validity of the subject application independent of testing semantics.

18. Computer apparatus as claimed in claim 17 wherein the extraction means further extracts from interfaces and descriptors defining the object: a creation method, a find method, a remove method, a setter method, a getter method, the object name and object external name.

19. Computer apparatus as claimed in claim 18 wherein the filling means utilizes the template fixed portion of source code in conformance with programming rules for development of a distributed application, and the template implements a scenario for checking a set of object behavior rules of a distributed application.

20. Computer apparatus as claimed in claim 17 wherein the template implements any combination of:
- a scenario for checking object life-cycle rules,
- a scenario for checking the life-cycle rules of EJB or CORBA specifications;
- a scenario for checking creation of the selected object,
- a scenario for checking persistency of the selected object,
- a scenario for checking removal of the selected object, and
- a scenario for checking robustness of the selected object.

* * * * *